United States Patent Office 3,133,726
Patented May 19, 1964

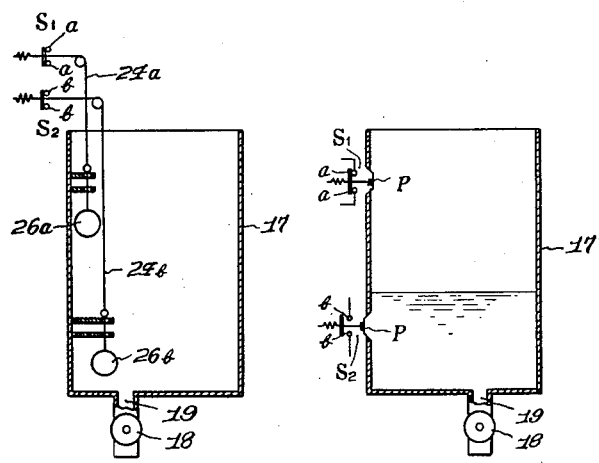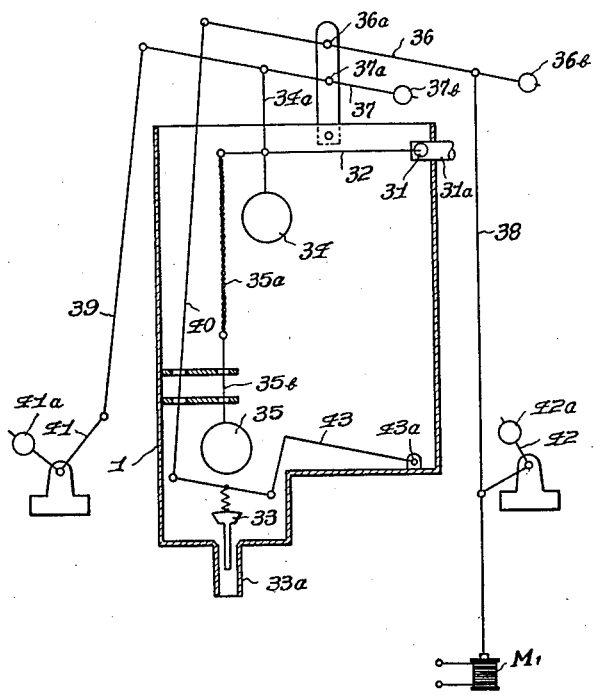

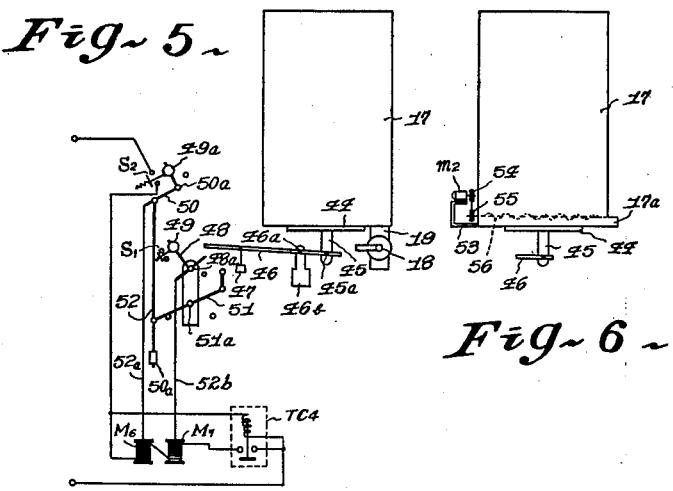
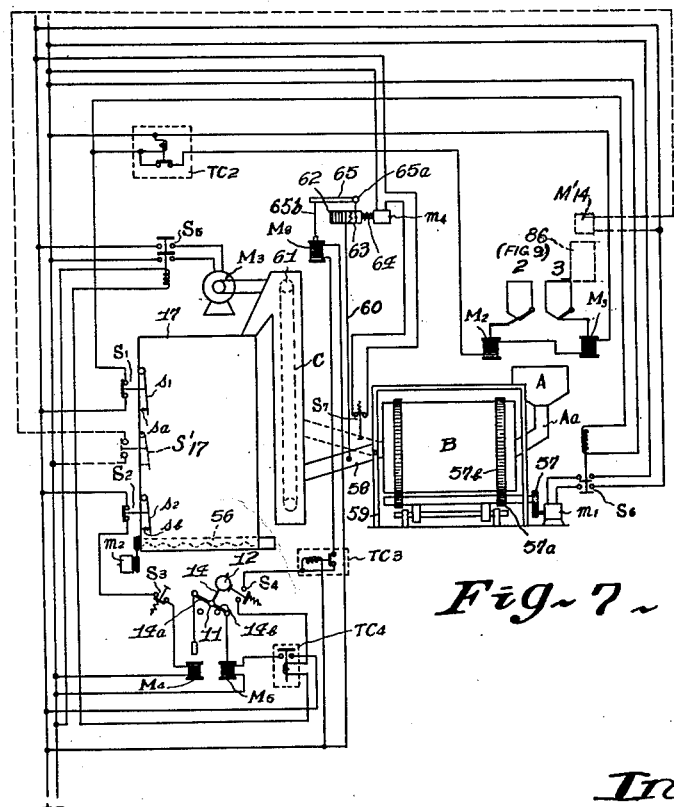

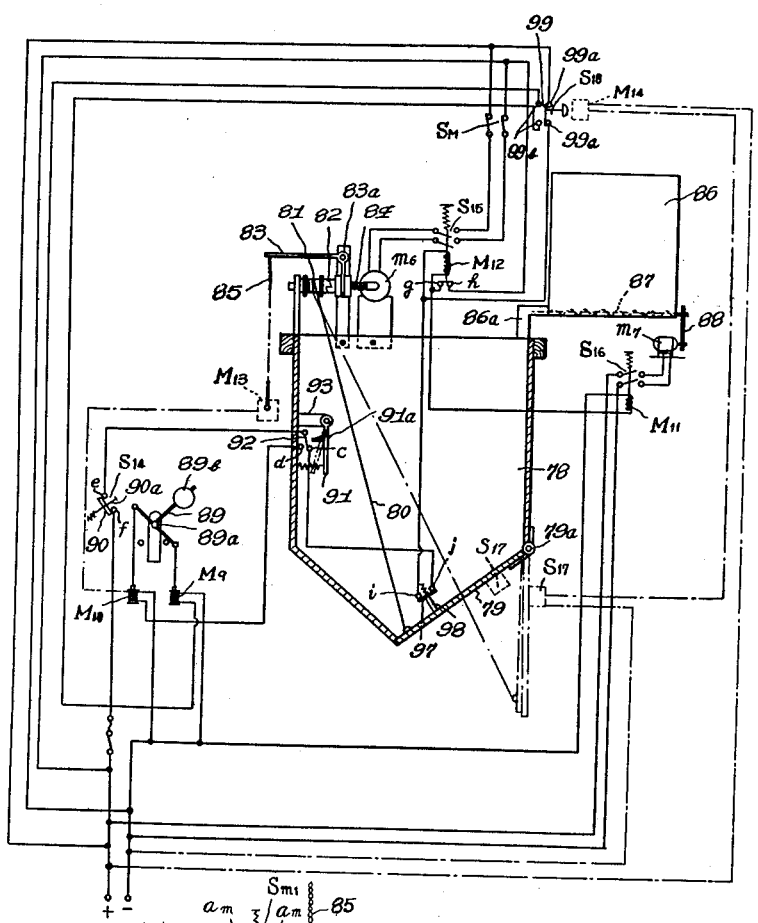
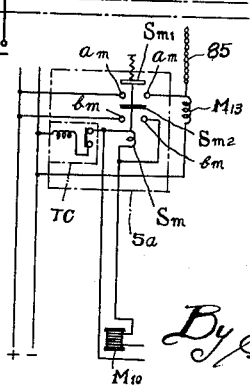

3,133,726
APPARATUS FOR THE AUTOMATIC MIXING AND ACCUMULATION OF SEVERAL KINDS OF STOCK-MATERIALS
Tomiji Tarukawa, 5556 5-chome, Kamiitabashi-machi, Itabashi-ku, Tokyo-to, Japan
Filed Jan. 6, 1958, Ser. No. 707,250
Claims priority, application Japan Jan. 6, 1957
14 Claims. (Cl. 259—3)

This invention relates to an improved apparatus for charging a thoroughly mixed stock-material into a delivering or accumulating tank.

An essential object of this invention is to provide an improved automatic apparatus capable of charging a mixed stock-material into a delivering or accumulating tank after said stock-material is prepared by mixing thoroughly several kinds of stock materials at a predetermined ratio.

The novel features which are believed to be characteristics of the present invention are set forth with particularity in the appended claims, the present invention itself, however, both as to its construction and operation, together with further objects and advantages thereof, may best be understood by reference to the following description, taken in connection with the accompanying drawings, in which the same members are indicated by the same numerals and characters, and in which:

FIG. 2 is a schematic view of a modification of the limit switch operating device in the embodiment in FIG. 1.

FIG. 3 is a schematic view of another modification of the limit switch operating device in the embodiment in FIG. 1.

FIG. 4 is a schematic view of an example of the liquid stock-material measuring tank to be used in the apparatus of this invention.

FIG. 5 is a schematic view of a further modification of the limit switch operating device in the embodiment in FIG. 1, which is suitably applicable for powdery stock-material accumulation.

FIG. 6 is a schematic view of a modification of the accumulator to be used in the apparatus of this invention.

FIG. 7 is a schematic view of another example of this invention.

FIG. 9 is a schematic view of a powdery stock-material measuring tank to be used in the apparatus of FIGURES 1, 7 and 8 of this invention.

FIG. 9A is a connection diagram of the relay switch device to be used in the example in FIG. 9.

Figure 1:
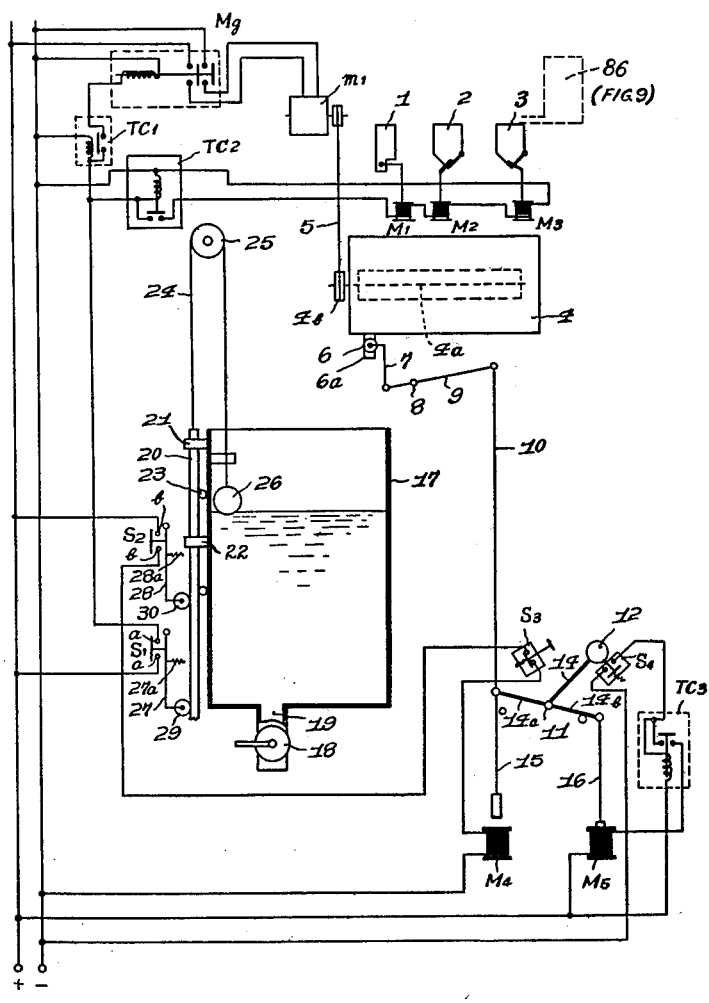
FIG. 1 is a schematic view of an example of this invention.

Referring to FIG. 1, the apparatus comprises three kinds of stock-material measuring tanks 1, 2 and 3, each of said tanks being made so as to accumulate a predetermined amount of one kind of the liquid, solid and powdery stock-materials and the ratio of said amounts being selected so that they may be mixed to prepare a desirably mixed stock-material.

The operations of said tank 1 and the tanks 2 and 3 will be described, respectively, in connection with the examples in FIGS. 4 and 9.

The measuring tanks 1, 2 and 3 are provided, respectively, with the electromagnets $M_1$, $M_2$ and $M_3$ for opening the discharge ports of said tanks when said magnets are excited. The manner of operating the measuring tanks 2 and 3 by the electromagnets $M_2$ and $M_3$ is the same as described below in connection with FIGURE 9 where electromagnet $M_{13}$ performs in the same manner as electromagnets $M_2$ and $M_3$ to operate the tank 78 which is any of the tanks 2 or 3 in FIGURES 1, 7 or 8. Under the tanks 1, 2 and 3 is arranged a mixing tank 4 which is provided with a discharge valve 6 at its discharge pipe 6a and with a stirring device 4a therein, said device being driven by an electric motor $m_1$ through a driving belt 5 or chain. The valve 6 is connected to one end of a lever 9 through a connecting link 7, said lever 9 being pivoted at a pivotal shaft 8 and being connected, at another end thereof, to one arm 14a of a bell-crank 14 through a link 10, said bell-crank being provided with a weight 12 thereon. The ends of both arms of the bell-crank 14 are connected, respectively, to the iron cores of the electromagnets $M_4$ and $M_5$ by the strings 15 and 16.

Under the discharge pipe 6a of the tank 4 is arranged an accumulator or a delivering tank 17 so as to receive the mixed stock-material discharged from said discharge pipe 6a, said accumulator being provided with a discharge pipe 19 having a discharge valve 18. A control rod 20 is slidably guided by the elements 21 and 22 attached to the accumulator 17 so that said rod 20 may be moved up and down. The rod 20 is provided with rollers 23 for making the motion of said rod smooth. On the top of the rod 20 is attached one end of a string 24, the other end of which is attached to a float 26 floated on the liquid in the tank 17, said string being hung over a pulley 25. Two limit-switches $S_1$ and $S_2$ are arranged along the rod 20, said switches being provided, respectively, with movable pieces 27 and 28 having, respectively, rollers 29 and 30 which are pressed on the rod 20 by the springs 27a and 28a. The switches $S_1$ and $S_2$ are made so that their stationary contacts $(a, a)$ and $(b, b)$ may be, respectively, closed by the movable contacts attached to the movable pieces 27 and 28 when the rollers 29 and 30 roll off the end of the rod 20 due to ascent of said rod.

On both sides of the bell-crank 14 are arranged, respectively, the switches $S_3$ and $S_4$ so that they may be opened when they are pushed by the turned weight 12.

The motor $m_1$ is provided with an electromagnetic switch $M_g$ capable of closing the circuit of the motor $m_1$ when it is excited. In the circuits of the electromagnetic switch $M_g$, magnets $M_1$, $M_2$ and $M_3$, and switch $S_4$ are, respectively, inserted the time switches TC1, TC2 and TC3.

The operation of the apparatus in FIG. 1 is as follows.

When the liquid level in the accumulator 17 lowers and the rod 20 is pulled upward so as to detach from the roller 29, the switch $S_1$ is closed, whereby the magnets $M_1$, $M_2$ and $M_3$ are excited to operate a discharge means (see FIGURE 9) and the stock-materials in the tanks 1, 2 and 3 are discharged into the mixing tank 4, and on the other hand, the switch $M_g$ is excited and the motor $m_1$ is made to start so as to stir the materials charged into said tank 4. When the liquid level in the accumulator 17 lowers further and the rod 20 is pulled further upward, the switch $S_2$ is closed, whereby the magnet $M_4$ is excited through the switch $S_3$, so that the valve 6 is opened through the links 7 and 10 and the lever 9 and the mixed stock-material in the tank 4 is discharged into the accumulator 17.

By the excitation of the magnet $M_4$, besides the opening of the valve 6, the bell-crank 14 is turned counterclockwise because of the attraction of the arm 14a by the magnet $M_4$ through the string 15, whereby the switch $S_3$ is opened by the weight 12, and the exciting circuit of the magnet $M_4$ is opened, and the valve 6 for the complete stirring of the stock-material in the tank 4, the exciting circuit of the switch $M_g$ may be opened by the action of the time switch TC1 so as to open the circuit of the motor $m_1$.

The stepwise operation of the switches $S_1$ and $S_2$ may be modified as shown in FIG. 2, in which two floats 26a and 26b are, respectively, supported by the strings 24a and 24b so as to be moved up and down within a short range in accordance with the liquid level in the accumulator 17, the other ends of said strings being, respectively, connected to the movable contact pieces of the switches $S_1$ and $S_2$ so that when each of said floats lower below a respective predetermined level, the switch $S_1$ or $S_2$ may be closed. The operation after closing of the switch $S_1$ or $S_2$ is the same as that in the embodiment in FIG. 1.

The embodiment in FIG. 2 may be further modified as shown in FIG. 3, in which the wall of the accumulator 17 is provided with elastic membranes $p$ at the positions corresponding, respectively, to the predetermined high and low levels of the stock-material in the accumulator 17, each of said membranes being arranged so as to be pushed out by the pressure of the stock-material in the accumulator.

Each of the switches $S_1$ and $S_2$ is arranged at such a position facing one membrane $p$ as shown in the drawing so that said switch may be closed by the force of a spring when the membrane is relieved of pressure from within upon lowering of the liquid in accumulator 17.

An illustrative concrete construction of the tank 1 in the embodiment in FIG. 1 is as follows. Referring to FIG. 4, the control device of the tank 1 comprises a stock-liquid charge pipe 31a having a charge valve 31; a control lever 32; a discharge valve 33 equipped in the discharge pipe 33a; a float 34 pivoted is accurately maintained at its opened state by said weight 12.

With the charging of the mixed stock-material into the accumulator 17, the rod 20 is lowered with the ascent of the float 26. During ascending of the float 26, first the roller 30 and then the roller 29 rides on the rod 20, whereby the switches $S_1$ and $S_2$ are opened. By the opening of the switch $S_1$, the time switches TC1, TC2 and the magnet $M_g$ are restored. By the opening of the switch $S_2$, the circuit of the magnet $M_4$ is opened.

On the other hand, when the bell-crank 14 is turned counterclockwise, the switch $S_4$ is closed and the magnet $M_5$ is excited through the time switch TC3, whereby the bell-crank 14 is attracted at its arm 14b by the magnet $M_5$ and the bell-crank 14 is turned clockwise, so that the switch $S_4$ is opened and the circuit of the magnet $M_5$ is opened. In this case, the complete discharge of the stock-material in the tank 4 requires a relatively long time. However, the time switch TC3 acts to make the excitation of the magnet $M_5$ lag for a time. Accordingly, it is possible to make the discharge of the tank 4 complete by selecting suitably the time lag of said time switch.

When the liquid level in the accumulator 17 lowers again by discharging the stock-material in said accumulator, the above-mentioned operation is repeated.

In the above embodiment, the time switch TC2 is designed so that upon elapse of a relatively short time which is necessary for the complete discharging of the contents in the tanks 1, 2 and 3, the exciting circuit of the magnets $M_1$, $M_2$ and $M_3$ may be opened by the action of the time switch TC2 so as to close the discharge openings of the tanks 1, 2 and 3. The time switch TC1 is designed so that upon elapse of a relatively long time which is necessary to the lever 32; another float 35 having large self-weight and having specific weight lower than that of the liquid in the tank 1, said float 35 being suspended from the free end of said lever 32 through a chain 35a and a rod 35b; levers 36 and 37 pivoted, respectively, at the pivotal shafts 36a and 37a, said levers being provided, respectively, with weights 36b and 37b; a lever 34a which connects the lever 37 to the pivotal point of the lever 32 and the float 34; a lever 39 which is pivoted at one end to the leftside end of the lever 37 and at another end to one arm of a bell-crank 41, another arm of said crank 41 being provided with a weight 41a screwed thereon; a link device composed of a link 43 pivoted at a pivotal shaft 43a and a link 40 which is pivoted at both ends to the left end of the lever 36 and to the free end of the link 43, said link 43 being positioned so that it may be pushed down by the float 35 when it is dropped, whereby the discharge valve 33 is closed; and a string 38 which is connected at its ends to the right end portion of the lever 36 and to the iron core of the electromagnet $M_1$, said string 38 being connected to one arm of a bell-crank 42, another arm of which is provided with a weight 42a screwed thereon.

The embodiment in FIG. 4 corresponds to the state, in which the magnet $M_1$ is excited and the discharge valve 33 is opened. That is to say, when the magnet $M_1$ is excited, the link 43 is turned clockwise through the lever 36 and the link 40 by the downward attraction of the string 38, whereby the weight 35 is pushed upward and the discharge valve 33 is pulled upward so as to open the discharge pipe 33a. In this case, the bell-crank 42 is forcibly turned counterclockwise by the downward attraction of the string 38, whereby the opened state of the valve 33 is secured by the turned weight 42a even when the magnet $M_1$ is demagnetized. When the liquid in the tank 1 is discharged out, the float 35 drops so as to push forcibly the link 43, whereby the discharge valve 33 is closed in the discharge pipe 33a and the string 38 is pulled upward through the link 40 and the lever 36. In this case, the bell-crank 42 is turned clockwise and the positions of the float 35 and the valve 33 are secured by the turned weight 42a. On the other hand, upon drop of the float 35, the lever 32 is pulled downward by the dropped weight 35 through the rod 35b and the chain 35a, whereby the charge valve 31 is opened and the liquid charging commences. When the float 34 ascends to a predetermined level with the increase of the liquid in the tank 1, the lever 32 is turned counterclockwise and the charge valve 31 is closed. Upon ascent of the float 34 to a position corresponding to the complete closing of the charge valve 31, the bell-crank 41 is turned counterclockwise, whereby the closed position of the charge valve 31 is secured by the weight 41a.

As described above, according to the embodiment in FIG. 4, a predetermined amount of the stock-liquid can be automatically charged into the tank 1 by suitatble control of the exciting circuit of the magnet $M_1$.

Figure 8:
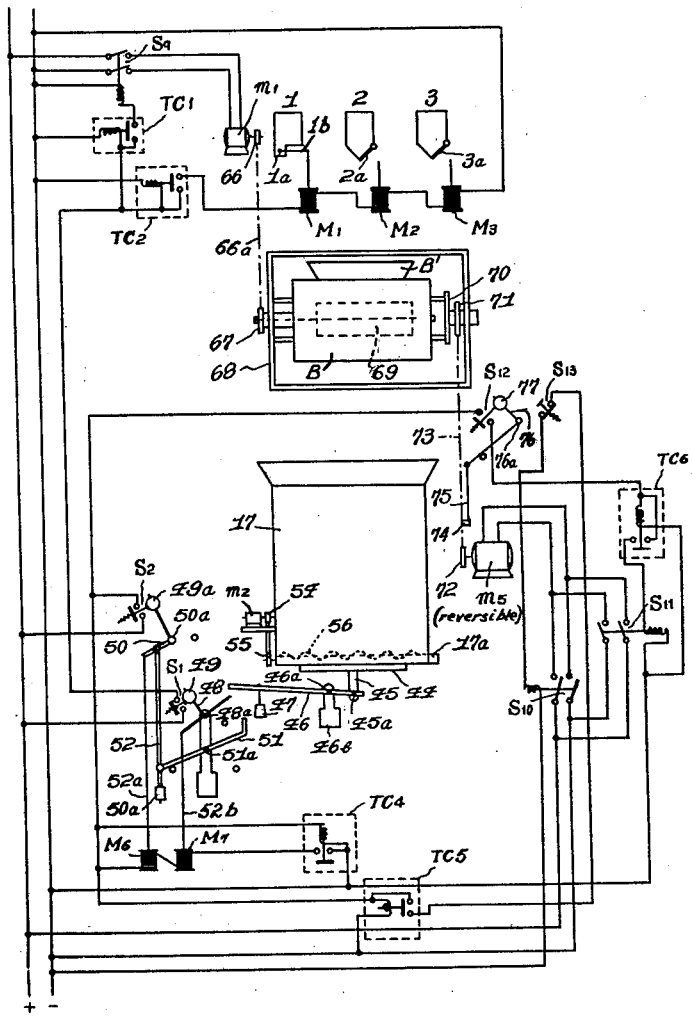
FIG. 8 is a schematic view of a still further example of this invention, which is suitably applicable for kneaded stock-material.

The charging operation of the tanks 2 and 3 in the embodiment in FIGS. 1, 7 and 8 is described hereafter in connection with the FIG. 9.

In the embodiment in FIG. 1, the limit switches $S_1$ and $S_2$ are arranged so as to be operated by the liquid level in the accumulator 17, but said switches may be operated by the weight of the liquid in said accumulator 17. Such an arrangement of the switches $S_1$ and $S_2$ is illustrated in FIG. 5, in which the accumulator 17 is provided with the discharge pipe 19 having a discharge valve 18 is mounted on a base board 44 having a supporter 45. A lever 46 is supported by a stationary supporter 46b at a pivotal shaft 46a and is pivoted, at one end, to the supporter 45 and is provided, at another end portion, with a weight 47 hung thereon.

A bell-crank 48, and a lever 51 provided with a link 52 connected thereto are provided. Bell-crank 48 and lever 51 are pivotally supported on shafts 48a and 51a, respectively, so that when the weight of the accumulator 17 decreases to a first predetermined value due to decrease of the liquid in said accumulator 17, the lever 46 is turned counterclockwise so as to turn the bell-crank 48 clockwise and when the weight of the accumulator 17 decreases further to a second predetermined value due to further decrease of the liquid in said accumulator, the lever 51 will also be turned clockwise. By the clockwise turning of the bell-crank 48, the switch $S_1$ is closed by the movable contact piece thereof. By the clockwise turning of the lever 51, the bell-crank 50 is turned clockwise through a link 52 which is connected between the bell-crank 50 and the lever 51 and provided with a balancing weight 50a, whereby the switch $S_2$ is closed by the movable contact piece thereof. By the closing of the switch $S_2$, the time switch TC4 is excited and after a predetermined time lag, the electromagnets $M_6$ and $M_7$ are excited through the movable contact of the time switch TC4, whereby the bell-crank 50 and the lever 51 are turned counterclockwise through a lever 52a and the bell-crank 48 is turned counterclockwise through a lever 52b to such positions as shown in the drawing. By said turning of the bell-crank 50, the switch $S_2$ is opened, whereby the exciting circuit of the magnets $M_6$ and $M_7$ and the time-switch TC4 is opened. The time lag of the time switch TC4 may be so selected that the magnets $M_6$ and $M_7$ may be excited upon charging of a predetermined amount of the stock-material into the accumulator 17. The magnets $M_6$ and $M_7$ may be excited separately. In this case, however, different time switches are, respectively, inserted in the exciting circuits of the magnets $M_6$ and $M_7$. In such a manner as described above, the accumulator 17 and the limit switch device are restored to their initial states. The operation after closing of the switches $S_1$ and $S_2$ are the same as in the embodiment in FIG. 1, so that the complete operation and construction of the apparatus are omitted herein.

When only the powdery stock-materials are to be mixed, the accumulator 17 illustrated in FIG. 6 should be used in the place of the accumulator 17 illustrated in FIG. 5. The accumulator 17 in FIG. 6 is provided with a screw conveyor 56 on the bottom of said accumulator, a discharge opening 17a, and an electric motor $m_2$ mounted on the supporter 53 which drives said conveyor 56 through pulleys 54 and 55.

Referring to FIG. 7, the apparatus comprises two kinds of amount measuring tanks 2 and 3, each of said tanks being made so as to accumulate a predetermined amount of one kind of powdery stock-materials and the ratio of said amounts of said tanks being selected so that said stock-materials may be mixed to prepare a desirably mixed powdery stock-material. The tanks 2 and 3 are provided, respectively, with the electromagnets $M_2$ and $M_3$ for opening the discharge doors of said tanks when said magnets are excited. The actual construction and operation of said tanks will be described hereinafter minutely in connection with the embodiment in FIG. 9.

Under the tanks 2 and 3 is arranged a receiving hopper A having discharge pipe Aa. This pipe Aa opens into the center opening of one side of a mixing tank B which is supported by a stationary frame 59 so as to be rotated by an electric motor $m_1$ through a reduction gear train 57 and another gear train 57a. A bucket conveyor C is arranged between the accumulator 17 and the mixing tank B so that the mixed stock-material charged into the bucket conveyor from the tank B through a conduit 58 may be conveyed upward and then charged into the accumulator 17, said conduit 58 being communicated at one end thereof with the center hole of the tank B and pivoted to the frame 59 so as to be turned to such a position as shown by broken line when it is pulled up by a wire rope 60 and so as to be dropped down to such a position as shown by full line when said wire rope is released. The driving wheel 61 in the bucket conveyer C is driven by an electric motor $m_3$ which is connected to an electric source through an electromagnetic switch $S_5$. The wire rope 60 is wound around a winding shaft 62 which is clutched with the shaft of an electric motor $m_4$ through a clutch 63. The clutch 63 is always clutched by the force of a spring 64, but when said clutch is pushed rightward by the clockwise turning of a crank lever 65 which is pivoted at a pivotal shaft 65a, said turning being caused owing to pulling said lever 65 by an electromagnet $M_8$ through a string or lever 65b, the winding shaft 62 is detached from the shaft of the motor $m_4$. The accumulator 17 is provided with two limit switches $S_1$ and $S_2$ and a screw conveyer 56 which is driven by an electric motor $m_2$. The switch $S_1$ is constructed so as to be closed when the powdery material in the accumulator 17 lowers to a first predetermined level and the switch $S_2$ is constructed so as to be closed when the material in the accumulator lowers to a second predetermined level. For the operation of the switches $S_1$ and $S_2$, control pieces $s_1$ and $s_2$ are provided in the accumulator 17, respectively, at said first and second predetermined levels, said pieces being pivoted at their upper ends so that they may be pushed against the force of the springs sa and sb by the pressure of the stock-material in the accumulator 17. The pieces $s_1$ and $s_2$ are, respectively, connected to the movable contact piece of the switches $S_1$ and $S_2$ so that when said piece $s_1$ or $s_2$ is pushed by the stock-material, the switch $S_1$ or $S_2$ may be opened. The springs sa and sb may be replaced by springs provided directly on the movable contact pieces of the switches $S_1$ and $S_2$. The apparatus comprises a bell-crank 14 pivoted at a pivotal shaft 11. The center arm of said crank is provided with a weight 12 screwed thereon and the ends of side arms 14a and 14b are, respectively, connected to iron cores of the electromagnets $M_4$ and $M_5$ through the strings. At both sides of the bell-crank 14, are arranged switches $S_3$ and $S_4$ so that when each of said switches is pushed by the weight 12, it may be opened. In the exciting circuits of the magnets $M_2$ and $M_3$, and $M_5$ are inserted, respectively, the time switches TC2 and TC4.

The electromagnets, electromagnetic switches and switches are electrically connected as shown in the drawing.

Operation of the apparatus in FIG. 7 is as follows:

When the stock-material in the accumulator 17 lowers to a first predetermined level and the switch $S_1$ is closed, the magnets $M_2$ and $M_3$ are excited through the time switch TC2, whereby the previously accumulated stock-materials in the tanks 2 and 3 are discharged into the hopper A and then charged into the mixing tank B through the pipe Aa. On the other hand, the electromagnetic switch $S_6$ is excited through the switch $S_1$, whereby the motor $m_1$ is made to start to stir the materials charged in the tank B.

The time switch TC2 operates after a time lag so as to open the exciting circuit of the magnets $M_2$ and $M_3$, so that when the time lag of the time switch TC2 is suitably selected, the closing of the tanks 2 and 3 can be done automatically upon complete discharge of the materials in said tanks.

When the material in the accumulator 17 lowers further and the switch $S_2$ is closed, the electromagnet $M_4$ is excited and the bell-crank 14 is turned counterclockwise and the weight 12 pushes the movable contact piece of the switch $S_3$ whereby the switch $S_3$ is opened and the exciting circuit of the magnet $M_4$ is opened. On the other hand, by said turning of the bell-crank 14, the switch $S_4$ is closed, whereby the electromagnetic switch $S_5$ and the electromagnet $M_8$ are excited. By the excitation of the magnet $M_8$, the clutch 63 is released from the winding shaft 62 by the counterclockwise rotation of the lever 65, whereby the shaft 62 becomes free and the conduit 58 is turned downward by its self-weight so as to take such a position as shown in the drawing by full line in which the material can be charged from the tank B into the bucket conveyer C, so that the mixed material is charged into the conveyer C. By the excitation of the switch $S_5$, the motor $m_3$ is made to start, whereby the material is charged from the conveyer C into the accumulator 17.

The time switch TC3 operates after a time lag, whereby the magnet $M_8$ is demagnetized and the clutch 63 is restored by the force of the spring 64, so that the shaft 62 winds up the wire rope 60 so as to raise the conduit 58. Upon raising of the conduit 58 to such a position as shown by broken line, the switch $S_7$ is opened and the motor $m_4$ is stopped. The time lag of the time switch TC3 is selected so that the complete discharge of the material in the tank B into the conveyer C may be carried out before operation of the time switch TC3. After closing of the switch $S_4$, the time switch TC4 operates after a time lag, whereby the magnet $M_5$ is excited and the bell-crank 14 is turned clockwise and the switch $S_4$ is opened. By this opening of the switch $S_4$, the exciting circuit of the time switch TC4 is opened and the exciting circuit of the magnet $M_5$ is opened.

The time lag of the time switch TC4 is selected so as to be longer than that of the time switch TC3.

When the stock-material in the accumulator 17 ascends above the first predetermined level, both the switches $S_1$ and $S_2$ are opened and the apparatus is restored to the first state.

Referring to the embodiment in FIG. 8, the apparatus comprises a stock-material measuring tanks 1, 2 and 3, the tank 1 being made so as to accumulate a predetermined amount of a liquid stock-material and the tanks 2 and 3 being made so as to accumulate the predetermined amounts of powdery stock-materials, the ratio of said amounts being selected so that they may be mixed to prepare a suitably kneaded stock-material. The tank 1 is provided with an electromagnet $M_1$ for opening the discharge valve 1a through a lever 1b when it is excited. The tanks 2 and 3 are provided, respectively, with the electromagnets $M_2$ and $M_3$ for opening the base doors 2a and 3a through such a mechanism as will be described minutely hereinafter in connection with the device in FIG. 9. Under said tanks is arranged a mixing tank B supported rotatably by a stationary frame 68, said tank B having a large filling and discharge opening B' at its upper portion and being provided with a stirring device 69 therein. The opening B' provides for filling tank B by gravity from tanks 1, 2 and 3 and tank B is rotatable so that it can be rotated to discharge its contents into accumulator 17. The shaft of the device 69 can be driven by an electric motor $m_1$ through a belt 66a which is put on the pulley 66 attached to the shaft of the motor $m_1$ and on a pulley 67 attached to the rotary shaft of the device 69. The tank B can be rotated by an electric motor $m_5$ through a chain wheel 71 attached concentrically to said tank, a chain wheel 72 attached to the shaft of said motor $m_5$, and a chain belt 73 meshed with said chain wheels. Under the tank B is arranged an accumulator 17 which is provided with such various members as are described in connection with the examples in FIGS. 5 and 6 by use of the same reference numerals. The apparatus comprises further electromagnetic switches $S_9$, $S_{10}$ and $S_{11}$, time switches TC1, TC2, TC5 and TC6, and a bell-crank 76 having a weight 77 screwed thereon and pivoted at a pivotal shaft 76a. At both sides of the bell-crank 76 are arranged two switches $S_{12}$ and $S_{13}$ which are normally closed so that the switch $S_{12}$ may be opened by the weight 77 when the crank 76 is turned counterclockwise and the switch $S_{13}$ may be opened by the weight 77 when the crank 76 is turned clockwise.

The various switches, electromagnets, electromagnetic switches and the time switches in the apparatus in FIG. 8 are connected as shown in the drawing.

The operation of the apparatus in FIG. 8 is as follows:

Now, let it be assumed that the accumulator 17 has been filled up with a desirably mixed final stock-material. When the amount of the material in the accumulator 17 decreases to a first predetermined value, the accumulator 17 ascends somewhat, whereby the lever 46 is turned counterclockwise so as to turn clockwise the bell-crank 48 and when the weight of the accumulator 17 decreases further to a second predetermined value due to further decrease of the material in the accumulator 17, the lever 51 is turned clockwise by the lever 46. By the clockwise turning of the bell-crank 48, the switch $S_1$ is closed because of the detachment of the weight 49 from the movable contact piece of said switch $S_1$, whereby the circuits of the magnets $M_1$, $M_2$ and $M_3$ are closed through the contacts of the time switch TC2 and the stock-materials are charged from the tanks 1, 2 and 3 into the upper opening of the mixing tank B. On the other hand, the exciting coil of the electromagnetic switch $S_9$ is closed through the contact of the time switch TC1, whereby the motor $m_1$ is made to start so as to drive the stirring device 69. The time lag of the time switch TC2 is so selected that it may be op- erated upon complete discharge of the materials in the tanks 1, 2 and 3 to open the circuit of the magnets $M_1$, $M_2$ and $M_3$. The time lag of the time switch TC1 is so selected that it may be operated to open the exciting circuit of the switch $S_9$ upon complete mixing of the material in the tank B. The time switch TC1 may be omitted.

When the weight of the accumulator 17 decreases further to a second predetermined value due to further decrease of the material in the accumulator 17, the lever 51 is also turned clockwise, whereby the bell-crank 50 is turned clockwise and the switch $S_2$ is closed because of the detachment of the weight 49a from the movable contact piece of the switch $S_2$. By the closing of the switch $S_2$, the exciting circuit of the switch $S_{10}$ is closed through the switch $S_{13}$ and the switch $S_{10}$ is closed, whereby the motor $m_5$ is driven to one direction and the tank B is rotated in one direction through the chain belt 73. With the movement of the chain belt 73, the lug 74 attached to said belt strikes the bell-crank 76, whereby the crank 76 is turned clockwise and the switch $S_{12}$ is closed and the switch $S_{13}$ is opened. By the opening of the switch $S_{13}$, the switch $S_{10}$ is opened and the motor $m_5$ is stopped. By the closing of the switch $S_{12}$, the exciting coil of the time switch TC6 is closed, but it operates after a time lag. After said time lag, the time switch TC6 operates and closes its contact, whereby the exciting coil of the switch $S_{11}$ is closed through said contact and the switches $S_{12}$ and $S_2$. Accordingly, the switch $S_{11}$ is closed and the circuit of the motor $m_5$ is reversely connected to the electric source, whereby the motor $m_5$ is made to start reversely. After a time lag, the string 75 connecting the lug 74 with one arm of the bell-crank 76 is pulled by the descending lug 74, whereby the bell-crank 76 is turned counterclockwise and the switch $S_{12}$ is opened. Accordingly, the switch $S_{11}$ is opened, whereby the motor $m_5$ is stopped.

There is an apprehension that the motor $m_5$ is shortcircuited through the switches $S_{10}$ and $S_{11}$ during the counterclockwise turning of the bell-crank 77. However, the time switch TC5 is inserted in the exciting circuit of the switch $S_{10}$, so that the abovementioned shortcircuiting can be avoided by selecting the time lag of said time switch so that the contact of said time switch may be broken just before the counterclockwise turning of the bell-crank 76. In the place of the time switch TC5, any other time relay or time switch may be inserted in the exciting circuit of the switch $S_{11}$ or in the circuit of the motor $m_5$.

On the other hand, the time switch TC4 is excited upon closing of the switch $S_2$, but it operates with a time lag, so that the magnets $M_6$ and $M_7$ are excited after elapse of said time lag. This time lag is so selected that the magnets $M_6$ and $M_7$ may be excited after opening of the switch $S_{12}$. By the excitation of the magnets $M_6$ and $M_7$, the bell-cranks 50 and 48 are pulled downward and restored to such positions as shown in the drawings, whereby the apparatus is restored to the first state.

The tanks 2 and 3 in the embodiments in FIGS. 1, 7 and 8 may be constructed as shown in FIG. 9, in which a measuring tank 78 which corresponds to tank 2 or to tank 3 in FIGS. 1, 7 or 8 is provided with a discharge door 79 hinged thereto at a pivotal shaft 79a. These latter elements are unnumbered in FIGS. 1, 7 and 8. Other elements are shown in FIG. 9 which are not seen in the other figures of drawings. A wire rope 80 wound around a winding shaft 81 which is mounted on the tank 78 is fixed, at its free end, to the door 79. The shaft 81 is driven through a clutch 82 by an electric motor $m_6$ mounted on the tank 78 so as to wind up the wire rope 80. The clutch 82 is attached to one arm of a crank-lever 83 pivoted at a pivotal shaft 83a and is so designed that it can be released through said crank-lever by pulling a wire or chain 85 against the force of a spring 84 which in turn is wound around the rotary shaft of the motor $m_6$. It will be understood that the FIG. 9 structure is included in FIGS. 1, 7 and 8 by reference to FIG. 9.

When the clutch 82 is released, the door 79 will be opened by its own weight and the weight of the stock-material applied thereon, because the rope 80 will unwind freely. For charging any powdery stock-material, the apparatus is provided with a stock-material supply container 86 having a discharge pipe 86a which is positioned above the tank 78. The bottom of the supply tank 86 is equipped with a conventional screw conveyer 87 which is driven by an electric motor $m_7$ through a belt 88 or a gear train, said motor being made to start when the switch $S_{16}$ is closed by an electromagnet $M_{11}$. At a predetermined level in the tank 78, a control member 91 is pivoted, at its top end, to a support 93 which is attached to the tank 78, said member being provided with a pin 91a. A movable contact piece 92 and stationary contacts c and d are arranged at the position near said pin 91a so that when said member 91 is pushed to the left to a position such as shown by chain line, the movable contact piece 92 will be brought in contact with the stationatry contact d and when said member 91 is restored, said piece 92 will be brought in contact with the stationary contact c. On the other hand, a movable contact piece 97 and stationary contacts i and j are arranged at the position near the door 79 so that when said contact piece 97 is pushed upward by a pin 98 attached to the door 79, the contact piece 97 will be brought into contact with the contacts i and j and when the door 79 is opened, the contact piece 97 will be detached from the contacts i and j.

A bell-crank 89 having an upright arm which is provided with a weight 89b screwed thereon is pivoted on a shaft 89a so that it may be turned to the right or left by excitation of the electromagnets $M_9$ or $M_{10}$, respectively, said magnet $M_9$ being connected to an electric source through starting contacts 99b, and said magnet $M_{10}$ being connected to said electric source through the contact d, contact piece 92 and a switch $S_{14}$ which consists of a movable contact piece 90 having a pin 90a and stationary contacts e and f. Said switch $S_{14}$ is arranged so that when the bell-crank 89 is turned leftward, the pin 90a may be pushed by the weight 89b, whereby the contact piece 90 may be detached from the contacts e and f.

The operation of the apparatus illustrated in FIG. 9 is as follows.

In the opened state of the door 79, when the motor switch SM is closed, the motor $m_6$ starts so as to drive the shaft 81 because of the closing of the switch $S_{15}$ due to opening of the contacts i and j, whereby the wire rope 80 is wound, the door 79 is closed, and the movable contact piece 97 is brought in contact with the contacts i and j by the pin 98. Accordingly, the circuit consisting of + pole of the electric source, the members e, 90, f, 92, c, j, 97, i, $M_{12}$, $M_{11}$ and — pole is closed, whereby the magnets $M_{12}$ and $M_{11}$ are excited. By the excitation of the magnet $M_{12}$, the switch $S_{15}$ is opened and the motor $m_6$ is stopped and the contacts g and h are shortcircuited, whereby the excitation of the magnet $M_{12}$ is maintained. By the excitation of the magnet $M_{11}$, the switch $S_{16}$ is closed and the motor $m_7$ starts, whereby the powdery stock-material in the accumulator 86 is charged automatically into the tank 78 through the discharge pipe 86a.

When the charged stock-material in the tank 78 increases to a predetermined level, the control member 91 is pushed to such a position as shown by chain line, whereby the contact piece 92 is detached from the contact c and is brought in contact with the contact d. Accordingly, the magnets $M_{11}$ are demagnetized, whereby the switch $S_{16}$ is opened and the stock-material charging is stopped. In this case, the switch $S_{15}$ is maintained at its opened state, because the magnet $M_{12}$ is excited through the contacts g and h.

On the other hand, by the contacting of the contact d with the contact piece 92, the exciting circuit of the magnets $M_{10}$ is closed through the closed switch $S_{14}$, whereby the bell-crank 89 is turned leftward so as to push the contact piece 90 by the weight 89b and the contacts e and f are opened so as to secure the opened state of the exciting circuit of the magnet $M_{11}$ even when the contact piece 92 makes chattering action.

Next, when it is desired to discharge the stock-material in the tank 78, it is only necessary to pull down the chain 85 (which may be done by the device illustrated in FIG. 9A), whereby the clutch 82 is declutched through the crank lever 83 and the winding shaft 81 is released. Accordingly, the door 79 is opened to a position as such shown by chain line due to the weight of the stock-material and the weight of said door 79, whereby the charged material is discharged.

The next closing of the door 79 can be easily carried out by restoring the chain 85 so as to make the clutch 82 engage with the shaft 81 by pushing temporarily the push button $S_{18}$ to open the contacts 99a so as to open the circuit of the contacts g and h, whereby the magnet $M_{12}$ is demagnetized, the switch $S_{15}$ is closed and the motor $m_6$ is started so as to wind up the wire rope 80.

On the other hand, by the pushing of said push-button, the contacts 99b are shortcuited by the contact piece 99 and the magnet $M_9$ is temporarily excited, whereby the bell-crank 89 is turned to such a position as shown in the drawing and the contacts e and f are shortcircuited by the contact piece 90.

Then, as described already, the door 79 is closed and charging of the stock-material is carried out automatically.

The embodiment in FIG. 9 relates to the apparatus, in which the closing of the discharge door 79 and the stock-material charging are continuously and automatically carried out, but discharge of the material in the tank is manually operated by pulling the chain 85 so as to disengage the clutch 82. Such apparatus can be used for automatic measurement of an amount of any powdery stock-material.

However, when it is desired to carry out one cycle consisting of the door closing and the charging and discharging of the stock-material, such an automatic operation can be done by providing an electromagnet $M_{13}$ corresponding to $M_2$ or $M_3$ of FIGS. 1, 7 or 8, which is made to operate in response to the operation of the contact piece 92 so as to pull the chain 85 upon charging of a predetermined amount of the stock-material into the tank 78.

Said response may be embodied, for example, by connecting the circuit of the magnet $M_{10}$ to the magnet $M_{13}$ through such a relay switch device 5a, as shown by chain line, said device being illustrated in FIG. 9A, in which the device 5a consists of an electromagnetic switch $S_m$ provided with contact pieces $S_{m1}$ and $S_{m2}$ and a time switch TC, said contact pieces $S_{m1}$ and $S_{m2}$ being supported so as to shortcircuit, respectively, the contacts $a_m$ in the circuit of the magnet $M_{13}$ and the contacts $b_m$ when said switch $S_m$ is excited. The exciting coil of the switch $S_m$ is connected to the magnet $M_{10}$ or to the circuit of the switch $S_{14}$ in series.

Accordingly, when the contact piece 92 is brought in contact with the contact d, the switch $S_m$ is excited and the contacts $a_m$ and $b_m$ are shortcircuited. By the contacting of the contact piece $S_{m2}$ with the contacts $b_m$, the excitation of the switch $S_m$ is maintained even after the switch $S_{14}$ is opened. By the contacting of the contact piece $S_{m1}$ with the contacts $a_m$, the magnet $M_{13}$ is excited and the chain 85 is pulled, whereby the door 79 is opened as described already.

The time switch TC is designed so that the exciting circuit of the switch $S_m$ may be opened upon complete opening of the door 79.

When it is desired or required to carry out continuously and repeatedly operations of closing the door and charging and discharging the stock-material, it is only necessary to provide a switch such as $S_{17}$ and electromagnet $M_{14}$ as shown in FIG. 9. Magnet $M_{14}$ is placed beside the relay switch device $S_{18}$, switch $S_{17}$ being arranged so as to be closed upon complete opening of the door 79 and said electromagnet $M_{14}$ being arranged so as to be excited by the closing of said switch $S_{17}$ so as to push the push button of $S_{18}$.

In the above-mentioned embodiments, the charging of the stock-material of a predetermined amount into each of the stock-material measuring tanks 1, 2 and 3 can be carried out manually or automatically. For the automatic operation of said charging, it is preferable to provide an intermediate switch device between the first and second switches $S_1$ and $S_2$, said intermediate switch device being arranged and connected so that when the mixed material in the accumulator 17 lowers to an intermediate level, said switch device may be operated in the same manner as in the case of the switches $S_1$ and $S_2$ so as to make the starting switch or electromagnet of each of the stock-material measuring tanks operate.

Such an intermediate switch is shown at $S'_{17}$ in FIGURE 7. It will be seen that as soon as the level of material in tank 17 has fallen below switch $S'_{17}$ (tank 17 in FIGURE 7 is shown empty) the switch will close which will actuate magnet or solenoid $M'_{14}$ which is similar to and is illustrated by solenoid $M_{14}$ seen in FIGURE 9, which pushes switch $S_{18}$ (see FIG. 9) to start the measuring sequence.

While I have described particular embodiments of my invention, it will, of course, be understood that I do not wish my invention to be limited thereto, since many modifications may be made and I, therefore, contemplate by the appended claims to cover all such modifications as fall within the true spirit and scope of my invention.

I claim:

1. An apparatus for automatic mixing and accumulation of several kinds of stock-materials, at least one of which is liquid stock-material, which comprises a plurality of stock-material measuring tanks, each measuring a predetermined amount of one of the stock-materials to be mixed, the ratio of the amounts in said measuring tanks being selected so as to provide stock-materials in suitable proportion, discharge means for said measuring tanks, a mixing tank arranged to receive the stock-materials discharged from said measuring tanks, a stirring device in said mixing tank, a discharge means for said mixing tank, an accumulator arranged to receive the mixed material from said mixing tank, a first limit switch arranged to be operated in response to a first decrease of a predetermined amount of material in the accumulator, a second limit switch arranged to be operated in response to the second decrease of a predetermined amount of said material in the accumulator, means to operate said first and second limit switches comprising a float in said accumulator, a rod supported so as to be moved up and down in accordance with the position of said float, and rollers normally pressed on said rod, said rollers being connected, respectively, to movable contact pieces of said first and said second limit switches, and said rod and rollers being arranged so that when said float lowers to a first predetermined level the roller connected to said first limit switch is detached from said rod to operate said first limit switch and when said float lowers further to a second predetermined level the roller connected to said second limit switch is detached from said rod so as to operate said second limit switch, a first device constructed and arranged to operate in response to the operation of said first limit switch to actuate said discharge means for said stock-material measuring tanks for discharge into said mixing tank and said first device also arranged to start mixing action in the mixing tank, said first device comprising electromagnets capable of opening the discharge openings of the measuring tanks when said magnets are excited by the operation of said first limit switch, an electric motor capable of driving said stirring device in said mixing tank, an electromagnetic switch for said motor which is actuated by the operation of said first limit switch, and a second device which operates in response to the operation of said second limit switch so constructed and arranged as to actuate the discharge means of said mixing tank to discharge the mixed material into said accumulator, said second device comprising an electromagnet which actuates the discharge means of the mixing tank when said magnet is excited by the operation of said second limit switch, and includes another electromagnet which inactivates said discharge means of said mixing tank upon complete discharge of the material from said mixing tank.

2. An apparatus for automatic mixing and accumulation of several measured stock-materials, said apparatus including an accumulator in which at least one stock-material is liquid, and in which the accumulator is supported so as to be moved up and down in proportion to the weight of the mixed material in the accumulator, limit switches operated by the up and down movement of said accumulator, a device for the operation of said limit switches including a balancing lever pivotally supported at its intermediate position and pivoted at one end to said accumulator and provided with a weight for balancing the accumulator, a bell-crank which can be turned by said lever when the accumulator rises to a first predetermined position owing to a decrease of the mixed material in the accumulator, said first limit switch being arranged so as to be operated by said turning of said bell-crank, a second bell-crank which can be turned by said lever when the accumulator rises further to a second predetermined position owing to the further decrease of the mixed material in the accumulator, said second limit switch being arranged so as to be operated by said turning of the second bell-crank.

3. An apparatus for automatic mixing and accumulation of several measured stock-materials, at least one of which is liquid stock-material, said apparatus comprising a plurality of stock-material measuring tanks, each said measuring tank accumulating a predetermined amount of one of the stock-materials to be mixed, the ratio of the amount accumulated in said tanks being selected so as to prepare a suitable mix of material, discharge means for said measuring tanks, a mixing tank, a stirring device in said mixing tank, said mixing tank being arranged to receive the stock-materials from said measuring tanks, discharge means for said mixing tank, an accumulator for the accumulation of mixed material, said accumulator being arranged to receive the material prepared in the mixing tank, a first limit switch operated in response to the first decrease of a predetermined small amount of the stock-material in the accumulator, a second limit switch operated in response to the second decrease of a predetermined large amount of said mixed material, means to operate said first and second limit switches comprising a device consisting of first and second floats in the accumulator, a string connected between said first limit switch and the first float, and a string connected between the said second limit switch and the second float, said first and second floats being arranged, respectively, at upper and lower positions in the accumulator so as to be moved up and down within a short range, an electric motor for driving the stirring device in the mixing tank, and an electromagnetic switch to actuate said motor, a first device which operates in response to the operation of said first limit switch, said first device including electromagnets capable of opening the discharge means of the measuring tanks when said magnets are excited by the operation of said first limit switch and capable of operating said electromagnetic switch, and a second device which operates in response to the operation of said second limit switch to activate the discharge means of said mixing tank to discharge the mixed material from the mixing tank into said accumulator, said second device consisting of an electromagnet which is constructed and arranged to open the discharge opening of the mixing tank so as to discharge the mixed material from said tank into the accumulator when said magnet is excited by the operation of the second limit switch, and another electromagnet which operates to close said discharge opening of the mixing tank upon complete discharge of the material in said mixing tank.

4. An apparatus for automatic mixing and accumulation of several kinds of stock-material, at least one of which is liquid stock-material, which comprises a plurality of stock-material measuring tanks, each to measure a predetermined amount of one of the stock-materials to be mixed, the ratio of the amounts in said tanks being selected so as to prepare a suitably mixed material, discharge means for each said measuring tank, a mixing tank, a stirring device in said mixing tank, said mixing tank being arranged to receive the stock-materials from said measuring tanks, discharge means for said mixing tank, an accumulator arranged to receive the mixed material from said mixing tank, means to remove some of the material from said accumulator, a first limit switch actuated by a first decrease of a predetermined amount of the mixed material in said accumulator, a second limit switch actuated by a second decrease of a predetermined amount of said mixed material in said accumulator, a first elastic membrane attached to the upper position of the wall of the accumulator to hold said first limit switch open when the liquid level in the accumulator presses against said first membrane, a second elastic membrane attached to the lower position of said wall to hold said second limit switch open when the liquid level in said accumulator presses against said second membrane, a first means operated in response to the closing of said first limit switch to actuate the discharge means of said measuring tanks for discharge of the stock-materials from the measuring tanks into the mixing tank and to actuate said stirring device, said first means comprising electromagnets capable of opening said discharge means of the measuring tanks when said magnets are excited by the operation of said first limit switch, said first means including an electric motor for driving the stirring device in the mixing tank and further including an electromagnetic switch which operates said motor when said switch is excited by the operation of the first limit switch, and a second means operated in response to the closing of said second limit switch to actuate the discharge means of said mixing tank to discharge the mixed material from the mixing tank into the accumulator, said second means comprising one electromagnet operatively connected to the discharge means of the mixing tank so as to discharge the mixed material from said mixing tank, and another electromagnet which is operatively connected to said discharge opening of the mixing tank to close said discharge means upon complete discharge of the material from said mixing tank.

5. An apparatus for automatic mixing several kinds of stock-materials to prepare a kneaded material and for accumulating said kneaded material, said apparatus including a plurality of stock-material measuring tanks, each measuring a predetermined amount of one kind of the stock-material to be mixed for preparation of the kneaded material, the ratio of the amounts measured by said tanks being selected so as to prepare a suitably mixed kneaded material, discharge means for said measuring tanks, a mixing tank supported rotatably on a horizontal axis, a kneading device in said mixing tank, a large filling and discharge opening in said mixing tank, said opening being normally positioned upwardly so as to receive the stock-materials discharged from the stock-material measuring tanks, an accumulator, means to position said mixing tank with said filling and discharge opening downward, said accumulator being positioned so that the material kneaded in the mixing tank may be dropped into said accumulator when the filling and discharge opening of the mixing tank is directed downwardly, whereby contents of said mixing tank may be discharged into said accumulator, a screw discharge conveyor at the bottom of said accumulator, said accumulator being supported to be moved up and down in response to the weight of the kneaded material in the accumulator, a first limit switch which is operated in response to a predetermined first decrease of the weight of the accumulator and its contents, and a second limit switch which is operated in response to a predetermined second decrease of said weight, means for the operation of the limit switches, said means comprising a lever pivotally supported at its intermediate position and pivoted at one end to the base of the said accumulator and provided with a balancing weight slidable on said lever for balancing the accumulator, a first bell-crank which can be operated by said lever when the accumulator rises to a first predetermined position owing to the first decrease of the weight of kneaded material in the accumulator, said first limit switch being arranged so as to be operated by said turning of said first bell-crank, a second bell-crank operated by said lever when said accumulator rises further to a second predetermined position owing to the second decrease of the weight of kneaded material in the accumulator, said second limit switch being arranged so as to be operated by said turning of the second bell-crank, a device operated in response to the operation of said first limit switch to actuate the discharge means of said measuring tanks to discharge said stock-materials into the mixing tank and also to actuate the kneading device in the mixing tank, means operated in response to the operation of said second limit switch to rotate the mixing tank to discharge the kneaded material from said tank into the accumulator, to hold said mixing tank for a time necessary for complete discharge of the kneaded material from said tank, and then to restore said mixing tank to its normal position.

6. An apparatus for the automatic mixing of several kinds of powdery stock-materials and for the accumulation of the mixed material, including several stock-material measuring tanks, each measuring tank including a discharge door at its bottom, each measuring a predetermined amount of one kind of stock-material to be mixed, and the ratio of the amounts measured by said tanks being selected so as to provide a suitable mixture of material, a mixing tank supported so as to be rotated, an electric motor for rotating said mixing tank, a hopper arranged under the measuring tanks to receive the stock-materials discharged from said tanks and to charge said stock-materials into said mixing tank, an accumulator, a screw conveyor on its bottom by which said accumulator may be emptied, a bucket conveyor arranged between said accumulator and said mixing tank so that the mixed powdery material in the mixing tank may be discharged from said mixing tank into said accumulator when said conveyor is operated, an electric motor for the operation of said bucket conveyor, a first limit switch which is operated in response to a first decrease of a predetermined amount of the mixed material in the accumulator, and a second limit switch operated in response to a second decrease of a predetermined amount of said mixed material in said accumulator, a first device operated in response to the operation of said first limit switch to charge the stock-materials from the measuring tanks into the mixing tank through said hopper and to actuate said motor to rotate said mixing tank, said device comprising electromagnets to open the discharge doors of the measuring tanks when said magnets are excited by the operation of said first limit switch, and an electromagnetic switch to cause the driving motor for the rotation of the mixing tank to operate when said switch is excited by the operation of said first limit switch, a second device operated in response to the operation of said second limit switch to actuate the bucket conveyor to carry the mixed material from the mixing tank into the accumulator, said second device comprising an electromagnetic switch which closes the circuit of the electric motor for the operation of said bucket conveyor when said switch is excited by the operation of said second limit switch, and an electromagnet which opens the exciting circuit of said electromagnetic switch.

7. In an apparatus for automatically mixing several kinds of stock-materials and accumulating the mixed material, which includes several kinds of stock-material measuring tanks, each having a discharge opening and measuring a predetermined amount of one kind of the stock-materials to be mixed, the ratio of the amounts of the materials measured in said tanks being selected so as to prepare the desired mix of material, a mixing tank arranged so as to receive the stock-materials discharged out of the discharge openings of said measuring tanks, a discharge for said mixing tank, said mixing tank having therein a stirring device and a motor for driving said stirring device, an accumulator for the accumulation of the mixed material, said accumulator being arranged so as to receive the mixed material discharged from said mixing tank, the combination of the above-mentioned members with an apparatus consisting of first and second electric limit switches which operate, respectively, in response to first decrease of a predetermined amount and second decrease of a further amount of the mixed material in said accumulator, a first device which operates in response to the operation of said first limit switch to open the discharge openings of said measuring tanks to discharge the stock-materials from said tanks into said mixing tank and to operate said motor, a second device which operates in response to the operation of said second limit switch so as to discharge the mixed material from said mixing tank into said accumulator.

8. An apparatus for automatically mixing several kinds of stock-materials and accumulating said mixed material, as claimed in claim 7, in which said switches are operated by a device including a float in the accumulator, a rod supported so as to be moved up and down in accordance with the level of said float, and two rollers normally pressed on said rod, said rollers being connected, respectively, to movable contact pieces of said first and second limit switches, and said rod and rollers being arranged so that when said float lowers to a first predetermined level the roller connected to the first limit switch is detached from said rod so as to operate said first limit switch, and when said float lowers further to a second predetermined level the roller connected to the second limit switch is detached from said rod so as to operate said second limit switch, said first device which operates in response to the operation of said first limit switch including electromagnets to open the discharge openings of the measuring tanks when said magnets are operated by the operation of the first limit switch, and also an electromagnetic switch which operates said motor when said switch is excited by the operation of the first limit switch, said second device which operates in response to the operation of said second limit switch including an electromagnet which opens the discharge opening of the mixing tank so as to discharge the mixed material from said tank into said accumulator when said magnet is excited by the operation of the second limit switch, and also another electromagnet which closes said discharge opening of the mixing tank upon the complete discharge of the material in said mixing tank.

9. An apparatus for automatically mixing several kinds of stock-materials and accumulating said mixed material as claimed in claim 7, in which said first switch is operated by a device consisting of a first float in the accumulator and a string connected between the movable contact piece of said first switch, and the second switch is operated by a device consisting of a float in the accumulator and a string connected between the movable contact piece of said second switch, said first and second floats being supported so that they may be lowered, respectively, upon lowering of the material level in the accumulator below said floats.

10. An apparatus for automatically mixing several kinds of stock-materials and accumulating said mixed material as claimed in claim 7, in which a first elastic membrane is mounted at the upper portion of the wall of the accumulator whereby when the liquid level in the accumulator lowers below said first membrane said first limit switch is closed, and a second elastic membrane is mounted at the lower portion of said wall whereby when the liquid level in the accumulator lowers below said second membrane said second limit switch is closed.

11. In an apparatus for automatically mixing several kinds of stock-materials and accumulating the mixed material, which includes several kinds of stock-material measuring tanks, each having a discharge opening and measuring a predetermined amount of one kind of the stock-materials to be mixed, the ratio of the amounts of the materials measured in said tanks being selected so as to prepare the desired mix of material, a mixing tank arranged so as to receive the stock-materials discharged out of the discharge openings of said measuring tanks, a discharge for said mixing tank, said mixing tank having therein a stirring device and a motor for driving said stirring device, an accumulator for the accumulation of the mixed material, said accumulator being arranged so as to receive the mixed material discharged from said mixing tank, the combination of the above-mentioned members with an apparatus consisting of first and second electric limit switches which operate, respectively, in response to first decrease of a predetermined amount and second decrease of a further amount of the mixed material in said accumulator, a first device which operates in response to the operation of said first limit switch to open the discharge openings of said measuring tanks to discharge the stock-materials from said tanks into said mixing tank and to operate said motor, a second device which operates in response to the operation of said second limit switch so as to discharge the mixed material from said mixing tank into said accumulator, and an intermediate switch between said first and second limit switches, said intermediate switch being arranged and connected so that when the mixed material in the accumulator lowers to an intermediate level said switch device is operated in the same manner as are the first and second limit switches so as to operate means to fill each of the stock-material measuring tanks.

12. In an apparatus for the automatic mixing of predetermined amounts of several stock-materials and for the accumulation of the mixture in an accumulator, which comprises stock-material discharge tanks for discharging a predetermined amount of each of the stock-materials to be mixed, said predetermined amounts being selected so as to prepare a suitable mixed material, each said tank being provided with a discharge device so as to discharge only a predetermined amount of the stock-material, a mixer arranged to receive the stock-materials discharged from said tank, the discharge device of said tanks being so arranged that the discharge operation of each said tank can be started only upon the complete discharge of the mixed material from said mixer, and an accumulator for accumulating the mixed material, said accumulator being arranged so that the material prepared in the mixing tank may be charged into said accumulator; in combination of said members with first and second electric limit switches, operating means for said first and second limit switches extending into said accumulator, said first switch being operated in response to a predetermined small lowering of the mixture level in the accumulator and said second switch being operated in response to another predetermined large lowering of the mixture level in the accumulator, a device adapted to operate in response to the operation of said first electric limit switch to operate said discharge device of said tanks so as to discharge the stock-materials from said tanks into the mixer and to make the mixing action of the mixture start, and a device which operates in response to the operation of said second electric limit switch to discharge the mixture from the mixer into the accumulator.

13. An apparatus for the automatic mixing of predetermined amounts of several stock-materials and for the accumulation of the mixture in an accumulator, which comprises stock-material discharge tanks for discharging a predetermined amount of each of the stock-materials to be mixed, said predetermined amounts being selected so as to prepare a suitable mixed material, each said tank being provided with a discharge device so as to discharge only a predetermined amount of the stock-material; a mixer arranged to receive the stock-materials discharged from said tanks and provided with a discharge device; an accumulator for accumulating the mixed material, said accumulator being arranged so that the material prepared in the mixing tank may be charged into said accumulator; and an electric switch which operates in response to a predetermined lowering of the mixture in the accumulator; and a device adapted to operate in response to the operation of said electric switch to operate said discharge devices of said stock-material discharge tanks so as to discharge the stock-materials from said tanks to said mixture and to make the mixing action of the mixture commence.

14. An apparatus for the automatic mixing of predetermined amounts of several stock-materials and for the accumulation of the mixture in an accumulator, which comprises stock-material discharge tanks for discharging a predetermined amount of each of the stock-materials to be mixed, said predetermined amounts being selected so as to prepare a suitable mixed material, each said tank being provided with a discharge device so as to discharge only a predetermined amount of the stock-material; a mixer arranged to receive the stock-materials discharged from said tanks and provided with a discharge device; an accumulator for accumulating the mixed material, said accumulator being arranged so that the material prepared in the mixing tank may be charged into said accumulator; and means so relating said accumulator, said stock-material discharge tanks and said mixer that the stock-materials are automatically charged from said stock-material discharge tanks into said mixer in response to decrease of a predetermined amount of the mixture in said accumulator and mixing action in said mixer is carried out.

References Cited in the file of this patent

UNITED STATES PATENTS

| | | |
|---|---|---|
| 1,037,135 | Tomlinson et al. | Aug. 27, 1912 |
| 2,243,188 | Biach | May 27, 1941 |
| 2,328,240 | Wiegand | Aug. 31, 1943 |
| 2,463,995 | Nielsen | Mar. 8, 1949 |
| 2,633,509 | Fields et al. | Mar. 31, 1953 |
| 2,662,665 | Harper | Dec. 15, 1953 |
| 2,727,733 | Carswell | Dec. 20, 1955 |
| 2,858,594 | Eirich et al. | Nov. 4, 1958 |